United States Patent
Crutchfield et al.

(10) Patent No.: US 8,086,583 B2
(45) Date of Patent: Dec. 27, 2011

(54) PARTITIONING FACT TABLES IN AN ANALYTICS SYSTEM

(75) Inventors: David Crutchfield, San Francisco, CA (US); Brent Cromley, Henderson, NV (US); James Hang, San Francisco, CA (US); Sean Li, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 304 days.

(21) Appl. No.: 12/026,310

(22) Filed: Feb. 5, 2008

(65) Prior Publication Data

US 2008/0228829 A1  Sep. 18, 2008

Related U.S. Application Data

(60) Provisional application No. 61/012,666, filed on Dec. 10, 2007, provisional application No. 60/906,345, filed on Mar. 12, 2007.

(51) Int. Cl.
*G06F 7/00* (2006.01)
(52) U.S. Cl. .................................. 707/705; 707/736
(58) Field of Classification Search ............ 707/705, 707/736
See application file for complete search history.

(56) References Cited

U.S. PATENT DOCUMENTS

| | | | | |
|---|---|---|---|---|
| 6,003,036 A | * | 12/1999 | Martin | 1/1 |
| 7,567,945 B2 | * | 7/2009 | Ali | 706/45 |
| 2006/0122964 A1 | * | 6/2006 | Yu et al. | 707/2 |

* cited by examiner

*Primary Examiner* — Hung Q Pham
(74) *Attorney, Agent, or Firm* — Kilpatrick Townsend & Stockton LLP

(57) ABSTRACT

An analytics system can obtain analytics data. The analytics system can automatically partition data based on months or another time period, into fact tables. A scrolling window system can combine multiple eligible fact tables into a single view. A reporting engine can then use the single view.

23 Claims, 3 Drawing Sheets

PARTITIONING FACT TABLES IN AN ANALYTICS SYSTEM

CLAIM OF PRIORITY

This application claims priority to U.S. Provisional Application No. 61/012,666 entitled "PARTITIONING FACT TABLES IN AN ANALYTICS SYSTEM" by David Crutchfield, et al. filed Dec. 10, 2007 which is hereby incorporated by reference and to U.S. Provisional Application No. 60/906,345 entitled "ANALYTICS" by David Crutchfield, et al. filed Mar. 12, 2007 which is hereby incorporated by reference.

BACKGROUND OF THE INVENTION

The present invention relates to an analytics system.

DETAILED DESCRIPTION

Analytics servers can collect information within portal and Web applications, helping administrators and community owners respond better to user needs. Detailed usage analytics can ensure that the content and applications developed and delivered to users are the right ones.

Real-time reports can enable quick responses to business needs by identifying the most requested pages, content and programs, and guiding the development of the most effective content and applications. Usage analytics can play a key role in measuring and increasing return on investment (ROI) from any portal, community or application deployment.

Analytics servers can help organizations to address several key business and technical challenges such as:
  Understanding what users want and need
  Understanding the perceived value of Web content and other IT resources
  Reliable and objective measurement and investment planning
  Correlation of Web hits to actual end users
  Performance monitoring and troubleshooting Analytics servers can deliver detailed information on the use of specific content items and portlets, community activity such as document downloads and discussion postings, and even activity by department or individual user.

Figure 1B:
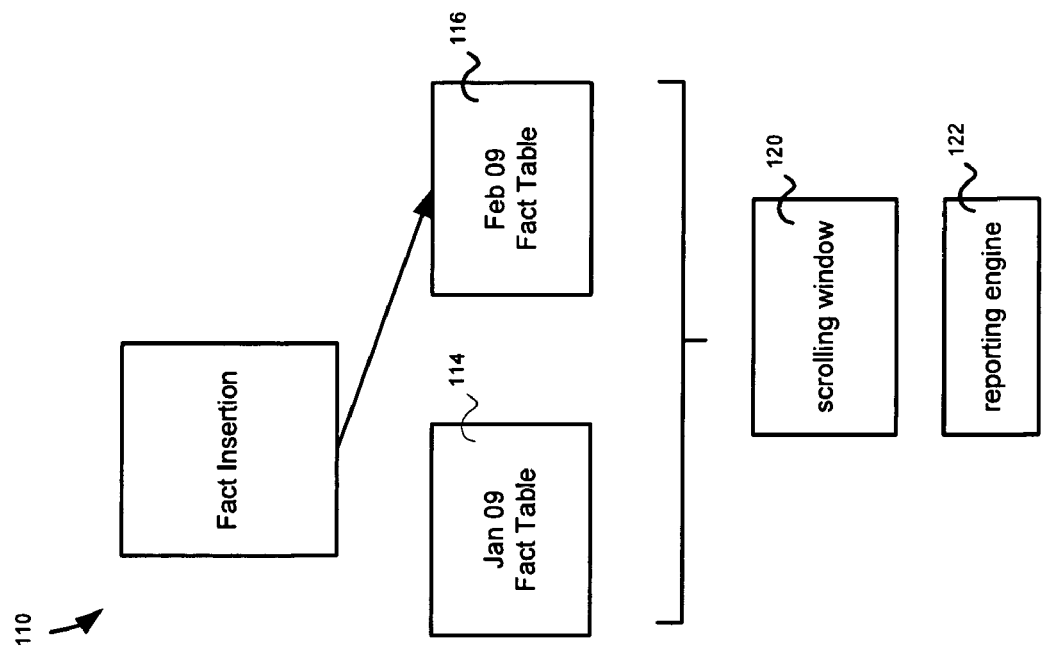
FIG. 1B shows an analytics system of one embodiment of the present invention.
Figure 1A:
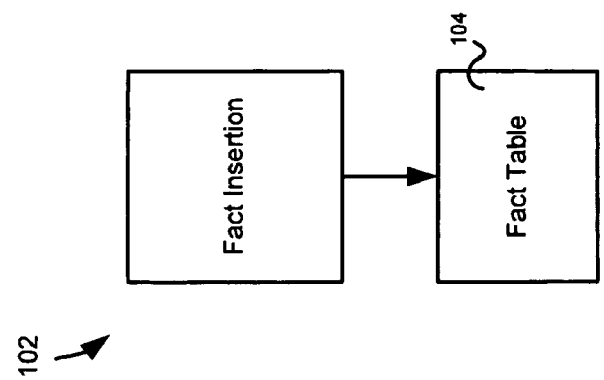
FIG. 1A shows an analytics system.

FIG. 1A shows an analytics system 102 where facts are stored in a fact table 104. In this example, the fact table can become unwieldy when there is a lot of fact data to be stored.

As shown in FIG. 1B, one embodiment of the present invention, is an analytics system 110 that obtains analytics data. The analytics system can automatically partition data based on a time period, such as months, into fact tables such as 112, 114 and 116. A scrolling window system can combine multiple eligible fact tables such as fact tables 114 and 116 in this example, into a single view. A reporting engine 122 can use the single view.

If each fact table contains fact data for a month, then a scrolling window for the last six months would only need the current fact table and six of the older fact tables to form the single view. Reports, searches or other data manipulation can be done within the single view by doing operations on the multiple relevant fact tables. Fact tables outside the single view can be backed up and removed from the system.

Records for added fact tables can be put in a scrolling window table. The scrolling window table can indicate each of the fact tables of the current view.

Fact tables outside the single view, such as fact table 112 in the example of FIG. 1B, can be backed-up.

In one example, only one of the fact tables, such as fact table 116 in this example, can be an active currently writable fact table. Other fact tables, such as fact tables 112 and 114 of this example, can be read only.

In one embodiment, when a partition does not yet exist, a single fact table can be partitioned into the multiple time period based fact tables.

In one example, at the end of a month, or other time period, the current active fact table can be made read only and a new active writable fact table can be created.

Figure 2:
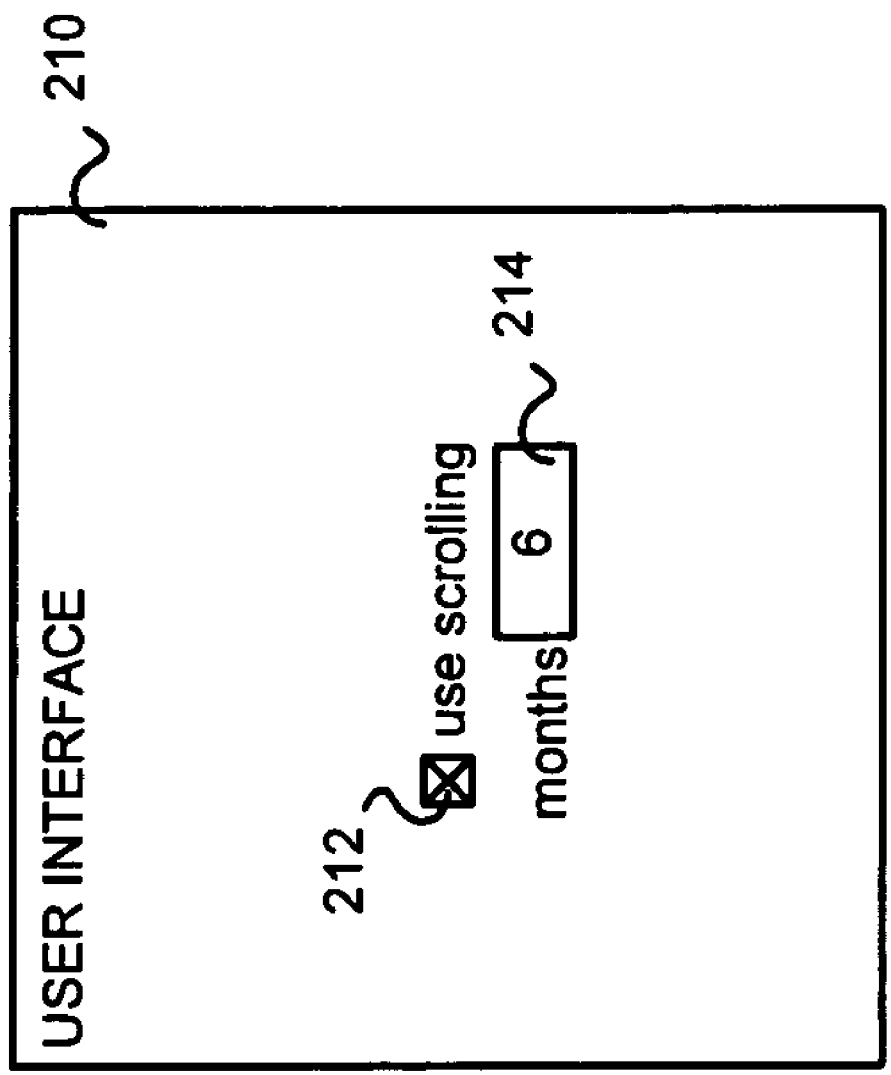
FIG. 2 shows a user interface for an analytics system of one embodiment of the present invention.

FIG. 2 shows an example of a user interface 210 of the present invention. The user interface 210 can be used to set a scrolling window. Button 212 can be used to select a scrolling time period. Field 214 can be used to input the size of the scrolling window.

An analytics database can store fact and dimension data used by the Analytics system. Typically, there is no archiving mechanism or process for maintaining size and performance. The database administrator of the system is pretty much on his/her own to take care of this, which could possibly result in a lengthy downtime and period of inactivity in portal metrics, both of which are undesirable.

The following describes details for an exemplary solution to this problem.

One embodiment involves partitioning each fact table by event month and year, and implementing a scrolling window mechanism that will consolidate eligible partitions into a single view which can be used by the reporting engine. The creation of future tables can occur somewhat automatically, however there are considerations that need to be taken into account, mostly surrounding physical resources. Once a partition is no longer in the view, the database administrator can be responsible for archiving and removing it from the database.

In an effort to keep fact data intact, table partitions can be used, as opposed to summarizing data based on some combination of table columns.

The benefits of the system can include: no data is lost; query performance increases when dealing with large amounts of data; and the data easily maintainable.

Using partitions, a database administrator can archive and remove table partitions using whatever mechanism they are comfortable with, and can add those partitions back easily while still reporting on the data at a granular level, if need be.

Using software such as Hibernate, an object/relational persistence and query service, one can introduce fact partition tables into our database by using one of two methods. If a mapping exists for a table that does not exist, Hibernate can create that table, along with constraints, based on the mapping definition. The other method is providing named SQL queries that are database specific.

For reporting, a view can be created that spans the partitions currently in the sliding window. This can be accomplished by using Hibernates sub-select mapping mechanism, or by using named queries to alter the view.

Separate mappings can be maintained for the collector and reporting processes, with each collection of mappings optimized according to usage. Also, by using separate mappings, the collection of events can continue with minimal interruption. This can be greatly influenced by how we implement the scrolling window is maintained.

At a high level, the process for creating the partitions and scrolling over them of one embodiment are described below.

During installation and configuration, the appropriate SQL scripts can be run on the Analytics database, creating the starting partitions/views and determining the appropriate, database specific, SQL script templates that will be used to create future partitions and alter fact window views.

Ideally, some type of timing process can be running in the background as a service, checking for the current date at some configurable time interval. Whenever the designated time interval is hit, the process should check the server's date, specifically, the month and year, and perform the following actions:

If a partition does not exist for the current month/year, handle this critical error.

If a partition does not exist for (month+1)/year, one should be created. This will give us a 1 month buffer against the above rule failing.

Handle any table creation errors.

Adjust the fact window view, according to the size specified by the user.

Switch the fact mapping used by the collector to point to current month/year partition, making it the active/writable partition.

Refresh Hibernate SessionFactory object.

Figure 3:
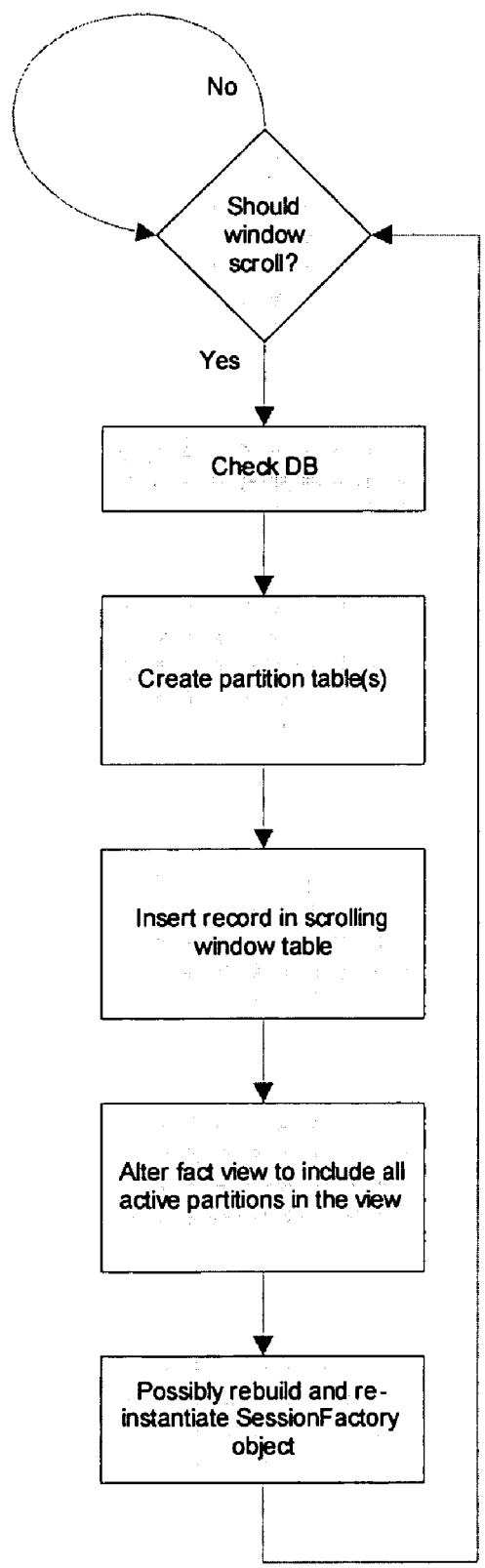
FIG. 3 shows a method of one embodiment of the present invention.

FIG. 3 visually describes, at a high level, an example of the process is discussed above.

The following are different queries performed on an exemplary SQL Server database with more than 10 million records across the different page view fact table partitions.

Current Query:

```
select count(*) as col_0_0_,
    utcommunit1_.community_name as col_1_0_,
    utcommunit1_.community_id as col_2_0_
from ut_page_view_facts utpageview0_
inner join ut_communities utcommunit1_ on
utpageview0_.community_id=utcommunit1_.community_id
inner join ut_time_dim uttimedim2_ on
utpageview0_.time_dim_id=uttimedim2_.time_dim_id
where (utpageview0_.page_view_type_id=1
and uttimedim2_.period_start>= '06/01/2005 12:00:00 AM'
and uttimedim2_.period_end<= '06/30/2005 11:59:59 AM')
group by utcommunit1_.community_name ,
utcommunit1_.community_id
order by count(*) desc , utcommunit1_.community_name
```

DB View Query (using Date string):

```
select count(*) as col_0_0_,
    utcommunit1_.name as col_1_0_,
    utcommunit1_.id as col_2_0_
from ut_page_view_fact_vw utpageview0_
inner join ut_communities utcommunit1_ on
utpageview0_.community_id=utcommunit1_.id
inner join ut_time_dim uttimedim2_ on
utpageview0_.time_dim_id=uttimedim2_.id
where utpageview0_.page_view_type_id=1
and uttimedim2_.period_start>='06/01/2005 12:00:00 AM'
and uttimedim2_.period_end<='06/30/2005 11:59:59 PM'
group by utcommunit1_.name , utcommunit1_.id
order by count(*) desc, utcommunit1_.name
```

DB View Query (using time_dim_id):

```
select count(*) as col_0_0_,
    utcommunit1_.name as col_1_0_,
    utcommunit1_.id as col_2_0_
from ut_page_view_fact_vw utpageview0_
inner join ut_communities utcommunit1_ on
utpageview0_.community_id=utcommunit1_.id
inner join ut_time_dim uttimedim2_ on
utpageview0_.time_dim_id=uttimedim2_.id
where utpageview0_.page_view_type_id=1
and utpageview0_.time_dim_id >= 65709568
and utpageview0_.time_dim_id <= 65711447
group by utcommunit1_.name , utcommunit1_.id
order by count(*) desc, utcommunit1_.name
```

Hibernate View Query (using Date string):

```
select count(*) as col_0_0_,
    utcommunit1_.name as col_1_0_,
    utcommunit1_.id as col_2_0_
from ( Select id, visit_id, community_visit_id, community_id, page_id,
view_datetime, response_time, page_view_type_id, user_id,
time_dim_id
    from ut_page_view_facts_200507
    union all
    Select id, visit_id, community_visit_id, community_id, page_id,
view_datetime, response_time, page_view_type_id, user_id,
time_dim_id
    from ut_page_view_facts_200506
    union all
    Select id, visit_id, community_visit_id, community_id, page_id,
view_datetime, response_time, page_view_type_id, user_id,
time_dim_id
    from ut_page_view_facts_200505
    union all
    Select id, visit_id, community_visit_id, community_id, page_id,
view_datetime, response_time, page_view_type_id, user_id,
time_dim_id
    from ut_page_view_facts_200504
    union all
    Select id, visit_id, community_visit_id, community_id, page_id,
view_datetime, response_time, page_view_type_id, user_id,
time_dim_id
    from ut_page_view_facts_200503
) utpageview0_
inner join ut_communities utcommunit1_ on
utpageview0_.community_id=utcommunit1_.id
inner join ut_time_dim uttimedim2_ on
utpageview0_.time_dim_id=uttimedim2_.id
where utpageview0_.page_view_type_id=1
and uttimedim2_.period_start>='06/01/2005 12:00:00 AM'
and uttimedim2_.period_end<='06/30/2005 11:59:59 PM'
group by utcommunit1_.name , utcommunit1_.id
order by count(*) desc, utcommunit1_.name
```

Hibernate View Query (using time_dim_id):

```
select count(*) as col_0_0_,
    utcommunit1_.name as col_1_0_,
    utcommunit1_.id as col_2_0_
from ( Select id, visit_id, community_visit_id, community_id, page_id,
view_datetime, response_time, page_view_type_id, user_id,
time_dim_id
    from ut_page_view_facts_200507
    union all
    Select id, visit_id, community_visit_id, community_id, page_id,
view_datetime, response_time, page_view_type_id, user_id,
time_dim_id
    from ut_page_view_facts_200506
    union all
```

| Hibernate View Query (using time_dim_id): |
| --- |
| Select id, visit_id, community_visit_id, community_id, page_id, view_datetime, response_time, page_view_type_id, user_id, time_dim_id<br>    from ut_page_view_facts_200505<br>    Union all<br>    Select id, visit_id, community_visit_id, community_id, page_id, view_datetime, response_time, page_view_type_id, user_id, time_dim_id<br>    from ut_page_view_facts_200504<br>    union all<br>    Select id, visit_id, community_visit_id, community_id, page_id, view_datetime, response_time, page_view_type_id, user_id, time_dim_id<br>    from ut_page_view_facts_200503<br>) utpageview0_<br>inner join ut_communities utcommunit1_ on utpageview0_.community_id=utcommunit1_.id<br>inner join ut_time_dim uttimedim2_ on utpageview0_.time_dim_id=uttimedim2_.id<br>where utpageview0_.page_view_type_id=1<br>and utpageview0_.time_dim_id >= 65709568<br>and utpageview0_.time_dim_id <= 65711447<br>group by utcommunit1_.name , utcommunit1_.id<br>order by count(*) desc, utcommunit1_.name |

The query ultimately returns 270 records with "DB View Query (using time_dim_id)" and "Hibernate View Query (using time_dim_id)" clocking in with the fastest response times. The database view approach can allow for the scrolling the window without having to re-instantiate a SessionFactory object.

The following tables, such as the following, can be partitioned:

|  |
| --- |
| ut_discussion_post_facts<br>ut_document_upload_facts<br>ut_document_view_facts<br>ut_generic_event_facts<br>ut_page_view_facts<br>ut_portlet_use_facts<br>ut_portlet_view_facts<br>ut_search_facts<br>ut_user_login_facts<br>ut_visits<br>ut_users |

The partition names can be such that the fact/event type, month and year are easily recognizable. The following format can be used:

as_fact_<event name>_<YYYY>_<MM>

Naming the tables in this manner will keep the fact partitions grouped together and neatly ordered when using a database management application such as SQL Server Enterprise Manager.

The same justification applies to the view naming convention. The naming format should be as follows:

as_fact_<event name>_vw

For example, the table partitions and view for the "Page View" event can use the following names:

|  |
| --- |
| For Partitions:<br>as_fact_pageview_2005_01<br>as_fact_pageview_2005_02<br>as_fact_pageview_2005_03<br>as_fact_pageview_2005_04<br>... |

|  |
| --- |
| For Partitions:<br>as_fact_pageview_2005_11<br>as_fact_pageview_2005_12<br>as_fact_pageview_2006_01<br>For View:<br>as_fact_pageview_vw |

The reporting process can have a Hibernate mapping to the fact view directly, and can provide read-only access to the facts in the database. By using a database view, a secondary process, whatever process manages the scrolling window, can modify the view at the database level without requiring a SessionFactory re-instantiation, and therefore not requiring a restart of the reporting process. From a reporting standpoint, the view can be the one point of contact for the facts; the partitions are abstracted away from it.

The collecting process can have a mapping to the currently active, writable partition. Since the partitions table for a particular fact/event will look the same schema-wise, we can use a single mapping and change the table name that that mapping points to programmatically to point to the current partition. This can be done before a SessionFactory object is instantiate, and if the table needs to change, due to scrolling, the configuration can be updated, reloaded, and a new instance of the SessionFactory object created. This can result in a collection downtime, and any events sent during this period of time could be potentially lost.

Solutions to this problem can include:
1. Do nothing and chalk up the data loss to our excepted margin of error.
2. Put the collector in a "Buffering" state until the new session is configured, initialized and available, and then flush the buffer.
3. Use a static mapping to a "current" fact partition table in the database, and handle moving from one partition to the other using native SQL.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system comprising:
    a processor configured to:
    partition data in a first database table into a plurality of table partitions representing corresponding individual time periods;
    receive a designated time interval via a user interface;
    generate a database view based on a subset of the plurality of table partitions,
    wherein the generated database view represents a current time period having a length based on the received designated time interval; and
    upon expiration of the received designated time interval:
    determine the current time period;
    if a table partition does not exist in the plurality of table partitions for a next time period immediately subsequent to the determined current time period, generate a new table partition for the next time period, wherein a length of the next time period is based upon the received designated time interval; and
    adjust the generated database view, wherein the adjusted database view represents the next time period and includes the new table partition.

2. The system of claim 1, wherein the designated time interval is a month.

3. The system of claim 1, wherein a record for each of the plurality of table partitions is stored in a second database table.

4. The system of claim 1, wherein table partitions that are not used for the database view are backed-up.

5. The system of claim 1, wherein only one table partition in the plurality of table partitions is an active, currently writeable table partition.

6. The system of claim 5, wherein other table partitions in the plurality of table partitions are read only.

7. The system of claim 5, wherein upon expiration of the designed time interval, the new table partition is made the active, currently writeable table partition.

8. The system of claim 1, wherein the current time period comprises one or more of the individual time periods corresponding to the one or more partitions, and the next time period comprises one of the individual time periods corresponding to the new table partition.

9. The system of claim 1, wherein the database view includes one or more partitions from the subset of the plurality of table partitions.

10. A method comprising:
    partitioning, by a computer system, data in a first database table into a plurality of table partitions representing corresponding individual time periods;
    receiving a designated time interval via a user interface;
    generating, by the computer system, a database view based on a subset of the plurality of table partitions,
    wherein the generated database view represents a current time period having a length based on the received designated time interval; and
    upon expiration of the received designated time interval:
    determining, by the computer system, a current time period;
    if a table partition does not exist in the plurality of table partitions for a next time period immediately subsequent to the determined current time period, generating, by the computer system, a new table partition for the next time period, wherein a length of the next time period is based upon the received designated time interval; and
    adjusting, by the computer system, the generated database view, wherein the adjusted database view represents the next time period and includes the new table partition.

11. The method of claim 10, wherein the designated time interval is a month.

12. The method of claim 10, wherein a record for each of the plurality of table partitions is stored in a second database table.

13. The method of claim 10, wherein table partitions that are not used for the database view are backed-up.

14. The method of claim 10, wherein only one table partition in the plurality of table partitions is an active, currently writeable table partition.

15. The method of claim 14, wherein other table partitions in the plurality of table partitions are read only.

16. The method of claim 14, wherein upon expiration of the designated time interval, the new table partition is made the active, currently writeable table partition.

17. A machine readable storage medium having stored thereon program code executable by a computer system, the program code comprising:
    code that causes the computer system to partition data in a first database table into a plurality of table partitions representing corresponding individual time period;
    code that causes the computer system to receive a designated time interval via a user interface;

code that causes the computer system to generate a database view based on a subset of the plurality of table partitions, wherein the generated database view represents a current time period having a length based on the received designated time interval; and code that upon expiration of the received designated time interval:

causes the computer system to determine a current time period;

causes the computer system to generate a new table partition for the next time period if a table partition does not exist in the plurality of table partitions for a next time period immediately subsequent to the current time period, wherein a length of the next time period is based upon the received designated time interval; and code that causes the computer system to adjust the database view, wherein the adjusted database view represents the next time period and includes the new table partition.

18. The machine readable storage medium of claim 17, wherein the designated time interval is a month.

19. The machine readable storage medium of claim 17, wherein a record for each of the plurality of table partitions is stored in a second database table.

20. The machine readable storage medium of claim 17, wherein table partitions that are not used for the database view are backed-up.

21. The machine readable storage medium of claim 17, wherein only one table partition in the plurality of table partitions is an active, currently writeable table partition.

22. The machine readable storage medium of claim 21, wherein other table partitions in the plurality of table partitions are read only.

23. The machine readable storage medium of claim 21, wherein upon expiration of the designated time interval, the new table partition is made the active, currently writeable table partition.

* * * * *